(12) United States Patent
Ishii et al.

(10) Patent No.: US 7,959,995 B2
(45) Date of Patent: Jun. 14, 2011

(54) DEEP DRAWING HEAT SHRINKABLE MULTILAYER FILM AND METHOD OF MANUFACTURING THE SAME

(75) Inventors: Hitoshi Ishii, Omitama (JP); Seiichi Ibe, Omitama (JP)

(73) Assignee: Kureha Corporation, Tokyo (JP)

( * ) Notice: Subject to any disclaimer, the term of this patent is extended or adjusted under 35 U.S.C. 154(b) by 643 days.

(21) Appl. No.: 11/729,774

(22) Filed: Mar. 30, 2007

(65) Prior Publication Data

US 2007/0237915 A1 Oct. 11, 2007

(30) Foreign Application Priority Data

Apr. 5, 2006 (JP) ................. 2006-104629

(51) Int. Cl.
*B65B 53/00* (2006.01)
*F16B 4/00* (2006.01)
(52) U.S. Cl. ................. 428/34.9; 428/36.6; 428/36.7
(58) Field of Classification Search ............. 428/34.9, 428/36.6, 36.7
See application file for complete search history.

(56) References Cited

U.S. PATENT DOCUMENTS 5,041,316 A * 8/1991 Parnell et al. ............. 428/35.4
7,018,719 B2 3/2006 Ueyama et al.

FOREIGN PATENT DOCUMENTS

| EP | 1 131 205 B1 | 10/1999 |
| JP | 0 405 933 A2 | 6/1990 |
| JP | 1 052 088 A1 | 1/1999 |
| JP | 2003-535733 | 2/2003 |
| WO | WO 01/43962 A1 | 12/2000 |

OTHER PUBLICATIONS

European Patent Office Extended European Search Report dated Aug. 3, 2007.

* cited by examiner

*Primary Examiner* — Michael C Miggins
(74) *Attorney, Agent, or Firm* — Reed Smith LLP

(57) ABSTRACT

A deep drawing heat shrinkable multilayer film includes: an intermediate layer made of a vinylidene chloride copolymer resin (a); and a resin layer made of a first thermoplastic resin (b) layered on at least one surface of the intermediate layer. The multilayer film has hot water shrinkabilities in longitudinal and transverse directions at a temperature of 90° C. range from 3% to 35% respectively.

20 Claims, No Drawings

DEEP DRAWING HEAT SHRINKABLE MULTILAYER FILM AND METHOD OF MANUFACTURING THE SAME

BACKGROUND OF THE INVENTION

1. Field of the Invention

The present invention relates to a deep drawing heat shrinkable multilayer film suitable for deep drawing top and bottom materials and the like and to a method of manufacturing the film.

2. Related Background Art

In conventional, stretchable and shrinkable multilayer films are widely used for packaging food such as raw meats, processed meat products, fishes, cheeses, and soups. As a method for packaging these contents, there are generally used a method for filling and packaging the contents into a bag or pouch bag, a method for filling and packaging the contents into a film of a bag just after the bag is formed by a vertical (longitudinal) pillow/transverse (horizontal) pillow type packaging machine, and a method for filling and packaging the contents by deep drawing.

For packaging the raw meats, a bag filling and packaging method is used in many cases. As such a bag filling and packaging method, a method is used in which a raw meat is filled in the bag manually and evacuated at a reduced pressure or vacuum evacuated in a vacuum chamber and thereafter an opening portion is sealed to provide a packaged product. In a series of operations in such filling and packaging methods, a filling rate is low. Accordingly an increase in the filling rate has been demanded from an economical point of view.

On the other hand, in a deep drawing packaging method with a filling rate higher than that of the bag filling and packaging method, unstretched and non-shrinkable multilayer films are used. Particularly, in the case where different types of content such as a ham, a roast pork, a bacon are filled and packaged, there are drawbacks that the packaged product is easily wrinkled due to poor film shrinkage, and that the films lack in a fitting property for the contents, so that liquid of the contents easily stays. Moreover, there is also a drawback in which film adhesion deteriorates due to poor film shrinkage, resulting in a poor keeping quality of contents.

In order to solve these problems, International Application Japanese-phase Publication No. 2003-535733 discloses a stretch-oriented multilayer film including at least three layers of: a surface layer (a) made of a thermoplastic resin; an intermediate layer (b) made of a polyamide-based resin; and a surface layer (c) made of a sealable resin. The multilayer film exhibits an impact energy of 1.5 Joule or more at a conversion thickness of 50 μm at a temperature of −10° C. In the specification, there is described a deep drawing package of a shrinkable multilayer film formed of a PET/mod-VL/Ny/EVOH/mod-VL/LLDPE resin structure.

However, in the conventional shrinkable multilayer film as described in JP 2003-535733 A, Ny and EVOH with an oxygen gas barrier property relating to the keeping quality of contents have humidity dependency. The above multilayer film has not always been satisfactory since, in particular, an oxygen gas transmission rate becomes high under high humidity, resulting in a poor oxygen gas barrier property under high humidity.

SUMMARY OF THE INVENTION

The present invention has been made in consideration of the above problems of the prior art, and it is an object of the present invention to provide a deep drawing heat shrinkable multilayer film having a high gas barrier property under high humidity, tight fitness to contents due to shrinkage and a good deep drawability. Another object is to provide a manufacturing method of such a film.

As a result of diligent studies with the aim of accomplishing the aforementioned objects, the present inventors came to achieve the present invention by discovering the following facts. A certain deep drawing heat shrinkable multilayer film has a high gas barrier property under high humidity, tight fitness to contents due to shrinkage and a good deep drawability. The deep drawing heat shrinkable multilayer film includes: an intermediate layer made of a vinylidene chloride copolymer resin (a); and a resin layer made of a first thermoplastic resin (b) layered on at least one surface of the intermediate layer. In the film, hot water shrinkabilities in longitudinal and transverse directions at a temperature of 90° C. range from 3% to 35% respectively.

A deep drawing heat shrinkable multilayer film of the present invention includes: an intermediate layer made of a vinylidene chloride copolymer resin (a); and a resin layer made of a first thermoplastic resin (b) layered on at least one surface of the intermediate layer. In the film, hot water shrinkabilities in longitudinal and transverse directions at a temperature of 90° C. range from 3% to 35% respectively.

Moreover, the deep drawing heat shrinkable multilayer film of the present invention preferably further includes an inner layer made of a sealant resin (d) having a melting point lower than that of the first thermoplastic resin (b) by 5° C. or more.

Furthermore, the deep drawing heat shrinkable multilayer film of the present invention may further include an outer layer made of a second thermoplastic resin (c) which has a melting point higher than that of the first thermoplastic resin (b) by 10° C. or more, and which makes the resin layer made of the first thermoplastic resin not the outermost layer.

Furthermore, in the deep drawing heat shrinkable multilayer film of the present invention, the first thermoplastic resin (b) is preferably made of at least one resin selected from the group consisting of a polyamide-based resin and a polyolefin-based resin.

Moreover, in the deep drawing heat shrinkable multilayer film of the present invention, the second thermoplastic resin (c) is preferably made of at least one resin selected from the group consisting of a polyester-based resin, a polyamide-based resin and a polyolefin-based resin.

Furthermore, in the deep drawing heat shrinkable multilayer film of the present invention, the sealant resin (d) is preferably made of at least one resin selected from the group consisting of a polyethylene homopolymer, a polyethylene copolymer, a polypropylene homopolymer, a polypropylene copolymer, an ethylene-based copolymer, and an ionomer.

Moreover, in the deep drawing heat shrinkable multilayer film of the present invention, an oxygen gas transmission rate is preferably 100 $cm^3/m^2 \cdot day \cdot atm$ or less under conditions of a temperature of 23° C. and 100% RH.

A deep drawing bottom film of the present invention is made of the deep drawing heat shrinkable multilayer film in which hot water shrinkabilities in longitudinal and transverse directions at a temperature of 90° C. range from 3% to 20% respectively.

A deep drawing top film of the present invention is made of the deep drawing heat shrinkable multilayer film in which hot water shrinkabilities in longitudinal and transverse directions at a temperature of 90° C. range from 5% to 35% respectively.

A deep drawing film kit of the present invention includes the deep drawing bottom film and the deep drawing top film.

A deep drawing packaged product includes the deep drawing bottom film and the deep drawing top film.

A method for manufacturing the deep drawing heat shrinkable multilayer film of the present invention includes the steps of: co-extruding at least two species of melted resins in a tubular shape to form a bubble of tubular film; water-cooling the bubble of tubular film to below the lowest melting point of the resins, thereafter reheating the bubble of tubular film to a temperature of the highest melting point of the resins or above, and drawing the bubble of tubular film in a longitudinal direction (mechanical direction) while fluid is being supplied to the interior of the bubble of tubular film to stretch 2.5 to 4 times in a longitudinal direction and a transverse direction respectively to form a biaxial stretched film; and folding the biaxial stretched film, thereafter performing heat treatment using steam or hot water of 60° C. to 95° C. from the outer surface side of the biaxial stretched film while fluid is being supplied to the interior of the biaxial stretched film, and performing relaxation treatment by 10% to 35% in longitudinal and transverse directions respectively at the same time with the heat treatment.

According to the present invention, it is possible to provide a deep drawing heat shrinkable multilayer film having a high gas barrier property under high humidity, tight fitness to contents due to shrinkage and a good deep drawability, as well as a manufacturing method thereof.

DETAILED DESCRIPTION OF THE PREFERRED EMBODIMENTS

The following will specifically explain the present invention with reference to preferred embodiments.

First, an explanation will be given of a deep drawing heat shrinkable multilayer film of the present invention. Namely, the deep drawing heat shrinkable multilayer film of the present invention includes a resin layer made of first thermoplastic resin (b) layered on at least one surface of an intermediate layer made of a vinylidene chloride copolymer resin (a) in which hot water shrinkabilities in longitudinal and transverse directions at a temperature of 90° C. range from 3% to 35% respectively. Moreover, the deep drawing heat shrinkable multilayer film of the present invention preferably further includes an outer layer made of a second thermoplastic resin (c) and an inner layer made of a sealant resin (d).

(Vinylidene Chloride Copolymer Resin)

The vinylidene chloride copolymer resin (a) (hereinafter referred to as a PVDC resin in some cases) for use in the present invention is a resin that contains a copolymer obtained by copolymerizing 60 weight percent to 98 weight percent of vinylidene chloride with 2 weight percent to 40 weight percent of other monomer which can copolymerize with the vinylidene chloride.

Such a monomer (comonomer), which can copolymerize with the vinylidene chloride, can include, for example, vinyl chloride; alkyl acrylate ester (the number of carbon atoms in the alkyl group is 1 to 18) such as methyl acrylate, ethyl acrylate, butyl acrylate, lauryl acrylate; alkyl methacrylate ester (the number of carbon atoms in the alkyl group is 1 to 18) such as methyl methacrylate, butyl methacrylate, lauryl methacrylate; vinyl cyanide such as acrylonitrile; aromatic vinyl such as styrene; vinyl ester of an aliphatic carboxylic acid having 1 to 18 carbon atoms such as vinyl acetate; alkyl vinyl ether having 1 to 18 carbon atoms; vinyl-polymerizable unsaturated carboxylic acids such as acrylic acid, methacrylic acid, maleic acid, fumaric acid; and alkyl esters (containing partial ester, and the number of carbon atoms in the alkyl group is 1 to 18) of vinyl-polymerizable unsaturated carboxylic acids such as maleic acid, fumaric acid, itaconic acid. As for these comonomers, one species thereof may be singly used or combination of two or more species may be used.

Moreover, among these comonomers, vinyl chloride, methyl acrylate, lauryl acrylate are preferably used. Additionally, a copolymerization ratio of these comonomers ranges preferably from 3 weight percent to 35 weight percent, more preferably from 3 weight percent to 25 weight percent, and particularly preferably from 4 weight percent to 20 weight percent. When the copolymerization ratio of comonomers is below the lower limit, there is a tendency that inner plasticization is insufficient to reduce melt-processability. Meanwhile when the ratio exceeds the upper limit, there is a tendency a that gas barrier property reduces.

A reduced viscosity [ηsp/C; unit=1/g] of the PVDC resin for use in the present invention ranges preferably from 0.035 to 0.070, more preferably from 0.040 to 0.067, and particularly preferably from 0.045 to 0.063 from a viewpoint of melt-processability, stretchability, packaging machinability, cold resistance, etc. in the case of film forming. When the reduced viscosity of the PVDC resin is below the lower limit, there is a tendency that the stretchability reduces, and a mechanical property of a biaxial stretched film also reduces. Meanwhile, when the reduced viscosity of the PVDC resin exceeds the upper limit, the melt-processability reduces, and coloring tends to occur, so that transparency thereof is apt to be lost. Additionally, in the present invention, combinations of PVDC resin of two or more species each having a different reduced viscosity may be used.

Although the PVDC resin for use in the present invention can be synthesized by any polymerization method such as a suspension polymerization method, an emulsion polymerization method and a solution polymerization method, synthesis is carried out preferably by the suspension polymerization method in the case of forming a PVDC resin compound as powder resin. In the case where the synthesis is thus carried out by the suspension polymerization method, there is a tendency that no grinding process is needed for controlling the particle size of powder resin made of PVDC resin. The particle size of such powder resin made of PVDC resin ranges preferably from 40 μm to 600 μm and more preferably from 50 μm to 500 μm. Additionally, the particle size of powder resin can be measured by, for example, a dry sieving method using a standard sieve.

In the aforementioned PVDC resin, it is possible, as required, to contain other resins such as polyethylene wax, oxidized polyethylene wax, polyethylene (low density, high density), ethylene-vinyl acetate copolymer, homopolymer of acrylic ester or copolymer thereof, homopolymer of methacrylic ester or copolymer thereof, methyl methacrylate-butadiene-styrene copolymer. Moreover, the aforementioned acrylic ester and methacrylic ester are preferably alkyl ester having 1 to 18 carbon atoms in the alkyl group. Additionally, in the case of using the aforementioned other resins, the amount of addition relative to 100 weight parts of the PVDC resin is preferably 20 weight parts or less.

Furthermore, in the aforementioned PVDC resin, it is possible, as required, to further contain various types of additives such as a heat stabilizer, a plasticizer, a processing aid, and a colorant. These various types of additives may be contained in the monomer composition at the time of manufacturing the powder resin by the suspension polymerization method. When the various types of additives are added to the powder resin at the time of manufacturing the powder resin by the suspension polymerization method, there is a tendency that liquid additives are absorbed in the powder resin, and that solid additives are adhered onto the surface of the powder resin under a temperature condition at the time of manufacturing the powder resin.

The heat stabilizer can include, for example, epoxy compounds such as epoxidized vegetable oil, epoxidized animal oil, epoxidized fatty acid ester, epoxy resin prepolymer and epoxy group-containing resins. As for these heat stabilizers, one species thereof may be singly used or combination of two or more species may be used. There is a tendency that adding the heat stabilizer to the PVDC resin according to the present invention makes it possible to improve the heat stability of the PVDC resin compound.

Moreover, as the epoxidized vegetable oil and the epoxidized animal oil, it is possible to use those that are obtained by epoxidizing natural animal and vegetable oils having unsaturated bonds with hydrogen peroxide, peracetic acid and like to thereby modify a double bond to an oxirane ring. As the epoxidized vegetable oil, it is preferable to use epoxidized soybean oil, epoxidized linseed oil, and the like. The epoxidized fatty acid ester includes an epoxy compound of an unsaturated fatty ester such as epoxidized octyl stearate. The epoxy resin prepolymer includes bisphenol-A glycidyl ether.

Furthermore, as the epoxy group-containing resin, there is no specific limitation if the resin contains at least one epoxy group, but, for example, a glycidyl group-containing acrylic resin and a glycidyl group-containing methacrylic resin are preferably used. As these glycidyl group-containing acrylic resin and/or glycidyl group-containing methacrylic resin, it is preferable to use a copolymer that contains a glycidyl ester of vinyl-polymerizable unsaturated organic acid as a copolymer component. As the glycidyl group-containing acrylic resin and/or glycidyl group-containing methacrylic resin, it is preferable to use a glycidyl ester of vinyl-polymerizable unsaturated organic acid, an acrylic ester containing no glycidyl group and/or methacrylic ester containing no glycidyl group, as well as a copolymer of these monomers with other ethylenically unsaturated monomer, which can copolymerize therewith.

Furthermore, as the glycidyl group-containing acrylic resin and/or glycidyl group-containing methacrylic resin, there can be used, for example, a glycidyl methacrylate-methyl methacrylate-styrene-butyl acrylate copolymer, a glycidyl methacrylate-methyl methacrylate copolymer, a glycidyl methacrylate-methyl methacrylate-styrene copolymer, a glycidyl methacrylate-vinyl chloride copolymer, a glycidyl methacrylate-ethyl acrylate copolymer, a glycidyl methacrylate-butyl acrylate copolymer, and a glycidyl methacrylate-vinylidene chloride copolymer.

Among these heat stabilizers, the epoxidized vegetable oil is preferably used in the field of food packaged products. As for the heat stabilizer such as the epoxidized vegetable oil, part of the amounts to be used is contained in the monomer composition in the PVDC resin polymerization step to prepare powder resin, and the rest of the amounts can be added to the powder resin at the time of preparing the PVDC resin compound. Moreover, the whole amounts of heat stabilizer to be used may be added at the time of polymerization, or may be blended with the powder resin at the time of preparing the compound.

In the case of using these heat stabilizers, the amount of addition relative to 100 weight parts of the PVDC resin is preferably in the range from 0.05 weight parts to 6 weight parts, more preferably from 0.08 weight parts to 5 weight parts, and particularly preferably from 0.1 weight parts to 4 weight parts. When the amount of addition of the heat stabilizer is below the lower limit, there is a tendency that heat stability of the PVDC resin compound cannot be sufficiently improved, which makes it difficult to conduct molding process, and which causes blackening. Meanwhile, when the amount of addition exceeds the upper limit, there is a tendency that the gas barrier of the biaxial stretched film and the cold resistance thereof are reduced, and that fisheye is caused.

The plasticizer includes, for example, polyester plasticizers such as dioctyl phthalate, acetyl tributyl citrate, dibutyl sebacate, dioctyl sebacate, acetylated monoglyceride, acetylated diglyceride, acetylated triglyceride and acetylated glycerides containing two to three of these, adipic acid and 1,3-butanediol, adipic acid and 1,4-butanediol, and a mixture of two or more species of these. As for these plasticizers, one species thereof may be singly used or combination of two or more species may be used.

In the PVDC resin polymerization step, these plasticizers can be contained in the PVDC resin compound by including in the powder resin of the PVDC resin to be generated, by blended with the powder resin of the PVDC resin, or by the combined method of these. Moreover, in order to contain the plasticizer in the powder resin to be generated in the PVDC resin polymerization step, vinylidene chloride is copolymerized with other monomer which can copolymerize therewith under the presence of plasticizer, or the plasticizer is added after copolymerization to make it possible to manufacture the powder resin of the PVDC resin. Furthermore, the plasticizer is contained in the powder resin of the PVDC resin in the polymerization step and an additional plasticizer can be blended therewith as required at the time of blending. Moreover, the whole amounts of plasticizer to be used may be added at the time of polymerization, or may be blended with the powder resin at the time of preparing the compound.

In the case of using such a plasticizer, the amount of addition relative to 100 weight parts of the PVDC resin is preferably in the range from 0.05 weight parts to 10 weight parts, and more preferably from 0.1 weight parts to 5 weight parts. When the amount of addition of the plasticizer is below the lower limit, there is a tendency that a plasticizing effect is poor, which makes it difficult to carry out melt extruding process. Meanwhile when exceeding the upper limit, there is a tendency that the gas barrier property deteriorates.

The processing aid includes, for example, inorganic powder such as silicon dioxide (silica), calcium carbonate. In the case of using these processing aids, the amount of addition relative to 100 weight parts of the PVDC resin is preferably in the range from 0.001 weight parts to 1 part by weight, more preferably from 0.03 weight parts to 0.8 weight parts, and particularly preferably from 0.01 weight parts to 0.5 weight parts.

The colorant includes, for example, organic pigments such as azos, phthalocyanines, quinacridones, and the like; inorganic pigments such as titanium oxide, aluminums, mica, carbon black, and the like; and extender pigments such as calcium carbonate, magnesium oxide, and the like. Among these, in the field of a packaged product of processed food such as fish sausage, and processed meat product, a red pigment such as pigment red is suitably used. As for these colorants, one species thereof may be singly used or combination of two or more species may be used. In the case of using these colorants, the amount of addition relative to 100 weight parts of the PVDC resin is preferably in the range from 0.001 weight parts to 3 weight parts and more preferably from 0.05 weight parts to 2 weight parts. Moreover, in the case of using titanium oxide as the colorant, the amount of addition of up to 10 weight parts can be used relative to 100 weight parts of the PVDC resin.

In the PVDC resin for use in the present invention, it is possible, as required, to further contain other stabilizers, an ultraviolet absorber, a pH adjuster, and the like.

The other stabilizers include calcium linoleate, calcium hydroxyphosphate, citric acid, ethylenediaminetetraacetic acid, and the like, and a proper amount thereof can be used as required.

The ultraviolet absorber can include 2-(2'-hydroxy-3',5'-di-tert-butylphenyl)-5-chlorobenzo triazole, and the like, and a proper amount thereof can be used as required.

The pH adjuster includes sodium pyrophosphate, disodium dihydrogen pyrophosphate, and the like. In the case of using these pH adjusters, the amount of addition relative to 100 weight parts of PVDC resin is preferably 0.5 weight parts or less. Additionally, these pH adjusters are generally used at the time of polymerizing the PVDC resin.

The dispersing agent includes, for example, glycerin, propylene glycols; and oligomers and polymers of aliphatic hydrocarbons or aromatic hydrocarbons. Among these, an aliphatic hydrocarbon oligomer having 2 to 8 carbon atoms is preferably used, and a liquid aliphatic hydrocarbon oligomer having weight average molecular weight of 300 to 5000 is particularly preferably used. These dispersing agents have functions of improving dispersibility of the inorganic additives and the organic pigments and preventing scattering thereof, and also have a function of reducing melt-processing temperature. In the case of using these dispersing agents, the amount of addition relative to 100 weight parts of the PVDC resin is preferably 2 weight parts or less.

(First Thermoplastic Resin)

A first thermoplastic resin (b) for use in the present invention can include a polyester-based resin, a polyamide-based resin, a polyolefin-based resin, a polystyrene-based resin, and a polyurethane-based resin.

Among these first thermoplastic resins (b), the polyamide-based resin and the polyolefin-based resin are preferable from the viewpoint that these resins can compensate for the strength of the vinylidene chloride copolymer resin or the like. Such a polyamide-based resin can include, for example, aliphatic polyamide copolymer such as nylon 6/66, nylon 6/69, nylon 6/610, nylon 6/12, and the like. Among these, nylon 6/66 and nylon 6/12 are particularly preferable in the point of molding process. As for these aliphatic polyamide copolymers, one species thereof may be singly used or mixture of two or more species may be used.

Furthermore, as the polyamide-based resin, a blend of the aforementioned aliphatic polyamide (co)polymer as a main component and aromatic polyamide may be also used. The aromatic polyamide means one in which at least one of diamine and dicarboxylic acid has an aromatic unit. The example thereof includes nylon 66/610/MXD6 ("MXD6" here indicates polymetaxylylene adipamide), nylon 66/69/6I, nylon 6/6I, nylon 66/6I, nylon 6I/6T ("nylon 6I" here indicates polyhexamethylene isophthalamide, and "nylon 6T" indicates polyhexamethylene terephthalamide).

As for these polyamide-based resins, preferably one species thereof may be singly used, or a mixture of two or more species may be used, having a melting point of 160° C. to 200° C. Moreover, these polyamide-based resins can contain up to about 30 weight percent of a thermoplastic resin such as olefin resin modified with acids such as a maleic acid or anhydrides thereof, ethylene-acrylic acid copolymer, ethylene-methacrylic acid copolymer, ionomer resin, ethylene-vinyl acetate copolymer, and saponified product thereof.

(Second Thermoplastic Resin)

A second thermoplastic resin (c) for use in the present invention has a melting point higher than that of the first thermoplastic resin (b) by 10° C. or more. Heat resistance of a deep drawing heat shrinkable multilayer film to be obtained is improved by further including an outer layer made of the aforementioned second thermoplastic resin (c), and therefore, it is possible to prevent adhesion to a seal bar caused when heat sealing is carried out and adhesion caused when heat-shrinking treatment for smoothing wrinkles on a packaged product or boil-cooking of the packaged product is carried out. The aforementioned second thermoplastic resin (c) can include polyester-based resin, polyamide-based resin, polyolefin-based resin, polyurethane-based resin and polystyrene-based resin. Among these second thermoplastic resins, the polyester-based resin, the polyamide-based resin, and the polyolefin-based resin are preferable from a viewpoint of excellent surface characteristics such as transparency, surface hardness, printability, heat resistance, and the like, and the polyester-based resin is particularly preferable.

(Sealant Resin)

A sealant resin (d) for use in the present invention has a melting point lower than that of the first thermoplastic resin (b) by 5° C. or more. If the melting point of such a sealant resin (d) exceeds the upper limit, adhesion to a seal bar is likely to occur when heat sealing is carried out. Then, such a sealant resin (d) can include those having a suitable seal strength in the range of 90° C. to 250° C. Moreover, such a sealant resin (d) can include, for example, polyethylene homopolymer or polyethylene copolymer, and polypropylene homopolymer or polypropylene copolymer, ethylene copolymer, and ionomer. As for these sealant resins (d), one species thereof may be singly used, or a mixture of two or more species may be used.

Furthermore, in the present invention, it is preferable that 3 weight percent to 30 weight percent of an adhesive resin (e) be mixed in the sealant resin (d) from the viewpoint of adhesion to the adjacent resin layer.

(Adhesive Resin)

As the adhesion resin (e) for use in the present invention, ethylene copolymer or acid-modified product thereof is used. For example, the adhesion resin (e) can include the ethylene copolymers such as ethylene-vinyl acetate copolymer, ethylene-ethylacrylate copolymer, ethylene-methacrylic acid copolymer, ethylene-acrylic acid copolymer and ionomer, and modified products with unsaturated carboxylic acids of these such as maleic acid, fumaric acid, acrylic acid, or acid anhydrides of these ethylene copolymers. As for these adhesive resins (e), one species thereof may be singly used, or a mixture of two or more species may be used.

Furthermore, among these adhesion resins (e), it is preferable to use ethylene-vinyl acetate copolymer containing 10 weight percent to 28 weight percent of vinyl acetate, ethylene-acrylic acid ester copolymer containing 10 weight percent to 28 weight percent of acrylic acid ester, or modified products with unsaturated carboxylic acids or acid anhydrides of these copolymers.

(Deep Drawing Heat Shrinkable Multilayer Film)

A deep drawing heat shrinkable multilayer film of the present invention is a film that includes a resin layer made of the aforementioned first thermoplastic resin (b) layered on at least one surface of an intermediate layer made of the aforementioned vinylidene chloride copolymer resin (a). Then, in the shrinkable multilayer film of the present invention, hot water shrinkabilities in longitudinal and transverse directions at a temperature of 90° C. need to range from 3% to 35% respectively. When the hot water shrinkability is below 3%, tight fitness to contents deteriorates. Meanwhile when exceeding 35% or more, a deep drawing property deteriorates since the orientation of an amorphous portion after stretching is not loosened. Additionally, the hot water shrinkabilities are values measured by the method to be explained in Examples later.

Moreover, in the case of using the shrinkable multilayer film of the present invention as a deep drawing bottom film, it is preferable that the hot water shrinkabilities in longitudinal and transverse directions at a temperature of 90° C. range from 3% to 20% respectively. When the hot water shrinkability is below the lower limit, there is a tendency that fitness to contents of a drawing portion becomes insufficient at the time of hot water shrinkage, and that lack of shrinkage at a seal portion occurs. Meanwhile when exceeding the upper limit, there is a tendency that the corners of the packaged contents are easily crushed, and that the seal portion is peeled off by shrinkage stress in some cases. Furthermore, in the case of using the shrinkable multilayer film of the present invention as a deep drawing top film, it is preferable that the hot water shrinkabilities in longitudinal and transverse directions at a temperature of 90° C. range from 5% to 35% respectively. When the hot water shrinkability is below the lower limit, there is a tendency that fitness to contents of the top film becomes insufficient, and that wrinkles are easily formed. Meanwhile when exceeding the upper limit, there is a tendency that the bottom side is pulled by the top film to thereby easily form stretch wrinkles at the time of hot water shrinkage, and that fitness to the contents becomes insufficient.

Moreover, in the case of using the shrinkable multilayer film of the present invention as the deep drawing bottom film, it is preferable that the film thickness range from 60 μm to 150 μm. When the film thickness is below 60 μm, the strength and the gas barrier property tend to become insufficient. Meanwhile, when exceeding 150 μm, there is a tendency that inner pressure in an inflation stretching at the time of manufacturing films increases, which makes it difficult to manufacture the films. Furthermore, in the case of using the shrinkable multilayer film of the present invention as the deep drawing top film, it is preferable that the film thickness range from 30 μm to 90 μm. When the film thickness is below 30 μm, the strength, the gas barrier property or the like tends to become insufficient. Meanwhile, when exceeding 90 μm, there is a tendency that economical disadvantages such as an increase in disposal amounts of packaged products arise. Furthermore, the top is formed in a flat shape or a shallow drawing shape and then used, there is a tendency that the strength, the gas barrier property or the like is sufficiently held even if the thickness is 90 μm or less.

Additionally, in the present invention, it is possible to combine the aforementioned bottom film and the top film to use the combination as a deep drawing film kit. Then, using such a deep drawing film kit makes it possible to obtain a deep drawing packaged product that allows long-term storage even under a high moisture condition.

Furthermore, although the deep drawing heat shrinkable multilayer film of the present invention is the film that includes the resin layer made of the aforementioned first thermoplastic resin (b) layered on at least one surface of the intermediate layer made of the aforementioned vinylidene chloride copolymer resin (a), it is preferable that the multilayer film further include the inner layer made of the aforementioned sealant resin (d). Moreover, in the deep drawing heat shrinkable multilayer film of the present invention, although the resin layer made of the first thermoplastic resin (b) may be used as an outer layer, the multilayer film may further include an outer layer made of the aforementioned second thermoplastic resin (c) instead of the resin layer made of the first thermoplastic resin (b) as the outer layer. Still moreover, the multilayer film may include an adhesion layer made of the adhesion resin (e) in addition to above described each layer from the viewpoint of the adhesions between the layers. Herein, the following will show examples of the specific layer structure of the deep drawing heat shrinkable multilayer film of the present invention. It should be noted that these examples are given for the illustrative purpose only, and the present invention is not limited to only these examples.

1: (b)/(e)/(a)/(e)/(d)
2: (b)/(e)/(a)/(e)/(b)/(e)/(d)
3: (c)/(e)/(a)/(e)/(b)/(e)/(d)
4: (c)/(e)/(b)/(e)/(a)/(e)/(d)

The thickness of the intermediate layer made of the aforementioned vinylidene chloride copolymer resin (a) is preferably 1 μm to 20 μm. When the thickness of the intermediate layer is below the lower limit, there is a tendency that high gas barrier property functions cannot be obtained, which makes it difficult to control the film thickness at the time of extruding process and film manufacturing. Meanwhile, when exceeding the upper limit, there is a tendency that rigidity of the film to be obtained is increased too much, and that economical disadvantages arise where disposal amounts of the packaged products are increased, or the like. Additionally, in the case of using the shrinkable multilayer film of the present invention as the deep drawing bottom film, the thickness of the intermediate layer is preferably 2 μm to 20 μm, more preferably 2 μm to 15 μm, and particularly preferably 2 μm to 10 μm. Moreover, in the case of using the shrinkable multilayer film of the present invention as the deep drawing top film, the thickness of the intermediate layer is preferably 1 μm to 10 μm.

Furthermore, the thickness of the resin layer made of the first thermoplastic resin (b) is preferably 5 μm to 40 μm, and more preferably 10 μm to 30 μm. When the thickness of the resin layer is below the lower limit, the strength of the packaged product tends to become insufficient. Meanwhile, when exceeding the upper limit, there is a tendency that the film becomes too hard to thereby reduce stretchability.

Moreover, the thickness of the outer layer made of the second thermoplastic resin (c) is preferably 1 μm to 20 μm, and more preferably 1 μm to 10 μm. When the thickness of the outer layer is below the lower limit, the strength of the packaged product tends to become insufficient. Meanwhile, when exceeding the upper limit, there is a tendency that the film becomes too hard to thereby reduce stretchability.

Furthermore, the thickness of the inner layer made of the sealant resin (d) is preferably 10 μm to 120 μm, and more preferably 10 μm to 80 μm. When the thickness of the inner layer is below the lower limit, there is a tendency that sufficient seal strength cannot be obtained. Meanwhile, when exceeding the upper limit, there is a tendency that the strength of the packaged product becomes insufficient, and that transparency of the film deteriorates.

Furthermore, the thickness of the adhesion layer made of the adhesion resin (e) is preferably 1 μm to 10 μm, and more preferably 1 μm to 5 μm. When the thickness of the adhesion layer is below the lower limit, there is a tendency that sufficient adhesion cannot be obtained. Meanwhile, even when exceeding the upper limit, there is a tendency that economical disadvantages arise where no further improvement in adhesion can be expected, and where disposal amounts of the packaged products are increased, or the like.

In the aforementioned deep drawing heat shrinkable multilayer film, an oxygen gas transmission rate is preferably 100 $cm^3/m^2 \cdot day \cdot atm$ or less under conditions of temperature of 23° C. and of 100% RH, more preferably 80 $cm^3/m^2 \cdot day \cdot atm$ or less and particularly preferably 50 $cm^3/m^2 \cdot day \cdot atom$ or less. When the oxygen gas transmission rate exceeds the upper limit, there is a tendency that deterioration occurs in which, when food is packaged the content of which is easily-oxidized such as raw meat, it discolors during storage.

Furthermore, in the aforementioned deep drawing heat shrinkable multilayer film, a water vapor transmission rate (WVTR) is preferably 20 g/m$^2$·day or less under conditions of temperature of 40° C. and of 90% RH in terms of weight loss. When the WVTR exceeds 20 g/m$^2$·day, there is a tendency that water of the contents in the packaged product passes through the film to cause vaporization easily, which makes it difficult to hold the net weight, which is the weight of the packaged product.

In the aforementioned deep drawing heat shrinkable multilayer film, a haze value (cloudiness value) is preferably 10% or less. When the haze value exceeds the upper limit, there is a tendency that the shape of the contents in the packaged product, and the hue thereof, and the like, cannot be determined visually.

(Manufacturing Method of Deep Drawing Heat Shrinkable Multilayer Film)

An explanation will be next given of a method for manufacturing the deep drawing heat shrinkable multilayer film of the present invention. Namely, the method for manufacturing the deep drawing heat shrinkable multilayer film of the present invention can be explained as follows. At least two species of melted resins are co-extruded in a tubular shape to form a bubble of tubular film.

The bubble of tubular film is water-cooled to below the lowest melting point of the resins, thereafter the bubble of tubular film is reheated to a temperature of the highest melting point of the resins or above. The bubble of tubular film is drawn in a longitudinal direction (flow direction of the bubble of tubular film) while fluid is being supplied to the interior of the bubble of tubular film to stretch 2.5 to 4 times in longitudinal and transverse directions (circumferential direction of the bubble of tubular film) respectively, thereby forming a biaxial stretched film.

Then, the biaxial stretched film is folded, and thereafter is subjected to heat treatment using steam or hot water of 60° C. to 95° C. from the outer surface side of the biaxial stretched film while fluid is being supplied to the interior of the biaxial stretched film, and is subjected to relaxation treatment by 10% to 35% in longitudinal and transverse directions respectively at the same time with the heat treatment, whereby the deep drawing heat shrinkable multilayer film of the present invention is obtained.

In the present invention, stretch ratios are preferably 2.5 to 4 in a longitudinal direction (MD) and a transverse direction (TD) respectively from the viewpoint that improvement in various characteristics required for the packaging film is implemented. When the stretch ratio is below 2.5, there is a tendency that necessary film heat shrinkability cannot be obtained after heat treatment, and that the film thickness deviation increases, which makes it difficult to obtain packaging properties.

Furthermore, in the present invention, a heat treatment temperature, which is a relaxation heat treatment condition, ranges preferably 60° C. to 95° C. When the heat treatment temperature is below 60° C., there is a tendency that relaxation at heat treatment is not easily achieved. Meanwhile when exceeding 95° C., there is a tendency that bubbles forms in a zigzag manner and becomes unstable. Furthermore, in the present invention, a relaxation percentage ranges preferably 10% to 35%. When the relaxation percentage is below 10%, there is a tendency that deep drawability becomes insufficient. Meanwhile when exceeding 35%, there is a tendency that the bubbles become unstable after relaxation to cause variations in width, which makes it impossible to carry out stable manufacturing.

Moreover, as is known well, the deep drawing heat shrinkable multilayer film of the present invention is crosslinked by electron beam irradiation before or after stretching, whereby stretchability is further improved in the case before stretching, and the strength and heat resistance are improved including after stretching, and therefore such crosslinking may be carried out in the present invention.

EXAMPLES

The following will specifically explain the present invention based on Examples and Comparative Examples, but the present invention is not limited to the following Examples. Additionally, a vinylidene chloride copolymer resin 1 (PVDC1), a vinylidene chloride copolymer resin 2 (PVDC2) and a modified ethylene-ethyl acrylate copolymer resin (M-EEA) used in the Examples and Comparative Examples were resins obtained by Preparation Examples 1 to 3 explained below, respectively. Moreover, the resins used in the Examples and Comparative Examples are shown together with their abbreviations in the following Table 1. Furthermore, manufacturing conditions of the heat shrinkable multilayer film in the Examples and Comparative Examples are shown together in the following Table 2.

Preparation Example 1

2 weight parts of epoxidized soybean oil and 1 part by weight of dibutyl sebacate were added to 100 weight parts of a vinylidene chloride-vinyl chloride copolymer resin having a copolymer ratio (monomer weight ratio: VD/VC) of 71/29 (made by Kureha Corporation, melting point: 145° C., reduced viscosity: 0.058, melt viscosity: 891 Pa·sec (at 175° C.)), and thereafter mixed together using a well-known wing mixer to obtain a vinylidene chloride copolymer resin 1 (PVDC1).

Preparation Example 2

2 weight parts of epoxidized linseed oil, 3 weight parts of dibutyl sebacate, 0.2 weight parts of silica and 0.1 weight parts of oxidized polyethylene wax were added to 100 weight parts of a vinylidene chloride-vinyl chloride copolymer resin having a copolymer ratio (monomer weight ratio: VD/VC) of 80/20 (made by Kureha Corporation, melting point: 164° C., reduced viscosity: 0.058), and thereafter mixed together using a well-known wing mixer to obtain a vinylidene chloride copolymer resin 2 (PVDC2)

Preparation Example 3

By use of using a flask provided with a stirrer, a temperature controller and a condenser, maleic anhydride and magnesium carbonate were reacted with an ethylene-ethyl acrylate copolymer resin (DPDJ-6128K, made by Nippon UNICAR CO., Ltd, ethylacrylate (EA) content: 15 weight percent, Vicat softening point: 61° C., MFR: 1.5 g/10 min) to obtain a modified ethylene-ethyl acrylate copolymer resin (M-EEA) having 0.5 weight percent of maleic anhydride and 0.4 weight percent of Mg.

TABLE 1

| Abbreviation | Resin name | Maker and grade | Melting point (°C.) | Remarks |
|---|---|---|---|---|
| PVDC1 | Vinylidene chloride copolymer resin 1 | — | 145 | Preparation example 1 |
| PVDC2 | Vinylidene chloride copolymer resin 2 | — | 164 | Preparation example 2 |
| EEA | Ethylene-ethyl acrylate copolymer resin (EA content: 15%) | Nippon UNICAR CO. Ltd. DPDJ-6128K | 90 | Vicat softening point 61° C. MFR = 1.5 g/10 min |
| M-EEA | Modified ethylene-ethyl acrylate copolymer resin | — | — | Preparation example 3 |
| Ny | NYLON 6/66 COPOLYMER RESIN COPOLYMER RATIO 80/20 WT % | TORAY INDUSTRIES, INC. AMILAN CM6241FS | 190 | Relative viscosity = 4.2 |
| IO | Ionomer resin | DU PONT-MITSUI CHEMICAL CO. HI-MILAN 7930 | 91 | Density = 0.94 MFR = 3.1 g/10 min |
| VLDPE | Ethylene-octene copolymerization very low density polyethylene polymerized with metallocene catalyst | DOW CHEMICAL CO. AFFINITY PL-1850 | 98 | Density = 0.902 MFR = 3.0 g/10 min |
| LLDPE | Ethylene-octene copolymer resin | IDEMITSU SEKIYU KAGAKU CO. LTD. MORETEC 0238CN | 122 | Density = 0.916 MFR = 2.0 g/10 min |

TABLE 2

| | Resin structures and thickness ratio of respective layers | Total thickness (μm) | Melted resin temperature (°C.) | Stretch ratio MD/TD | Heat treatment relaxation temperature (°C.) | Relaxation percentage (%) MD/TD |
|---|---|---|---|---|---|---|
| Example 1 | VLDPE(34)/EEA(3)/PVDC1(10)/EEA(3)/IO(40) | 90 | 180 | 2.8/2.8 | 90 | 20/20 |
| Example 2 | VLDPE(14)/EEA(3)/PVDC2(5)/EEA(3)/IO(20) | 45 | 180 | 2.8/2.8 | 90 | 20/20 |
| Example 3 | Ny(15)/M-EEA(3)/PVDC1(10)/M-EEA(3)/IO(59) | 90 | 230 | 2.5/3.1 | 90 | 20/20 |
| Example 4 | Ny(4)/M-EEA(3)/PVDC1(5)/M-EEA(3)/IO(25) | 40 | 230 | 2.5/3.1 | 90 | 20/20 |
| Example 5 | LLDPE(34)/EEA(3)/PVDC1(10)/EEA(3)/VLDPE(40) | 90 | 180 | 2.8/2.8 | 90 | 20/20 |
| Example 6 | Ny(15)/M-EEA(3)/PVDC1 | 90 | 230 | 2.5/3.1 | 90 | 20/20 |

TABLE 2-continued

| | Resin structures and thickness ratio of respective layers | Total thickness (μm) | Melted resin temperature (° C.) | Stretch ratio MD/TD | Heat treatment relaxation temperature (° C.) | Relaxation percentage (%) MD/TD |
|---|---|---|---|---|---|---|
| Example 7 | (5)/M-EEA (3)/VLDPE (64) Ny(4)/M-EEA (3)/PVDC1 (5)/M-EEA (3)/VLDPE(25) | 40 | 230 | 2.5/3.1 | 90 | 20/20 |
| Example 8 | Ny(11)/M-EEA (3)/LLDPE (20)/EEA (3)/PVDC1(10)/ EEA(3)/ VLDPE(40) | 90 | 230 | 2.5/3.0 | 90 | 20/20 |
| Comparative example 1 | VLDPE(34)/ EEA(3)/PVDC1 (10)/EEA (3)/IO(40) | 90 | 180 | — (unstretched) | — | — |
| Comparative example 2 | VLDPE(34)/ EEA(3)/PVDC1 (10)/EEA (3)/IO(40) | 90 | 180 | 2.8/2.8 | No relaxation treatment | No relaxation treatment |

Example 1

First, in order to achieve the layer structure of VLDPE(34)/EEA(3)/PVDC1(10)/EEA(3)/IO(40) where the layers were formed from the outer side to the inner side sequentially with thickness ratios of respective layers indicated in the parentheses, the respective resins were melted and extruded by a plurality of extruders, and the melted resins were introduced into an annular die, the introduced resins were melt-bonded to obtain the aforementioned layer structure. Thus, co-extrusion process was performed. A melted bubble of annular film having a temperature of 180° C. extruded from an outlet of the die was cooled to 10° C. to 25° C. in a water bath to obtain a bubble of annular film having a flat width of about 200 mm. Next, the obtained flat bubble of annular film was heated while being passed through hot water of about 90° C. to thereafter obtain a bubble-shape tubular film. The bubble-shape tubular film was biaxially stretched in a longitudinal direction (MD) at a stretch ratio of 2.8 times and in a transverse direction (TD) with a stretch ratio of 2.8 times simultaneously by an inflation method while being cooled by airing at 15° C. to 20° C. Then, the obtained biaxial stretched film was guided into a heat treatment tube with a cylinder shape to obtain a bubble-shape film. The bubble-shape film was subjected to relax heat treatment for about two seconds while being relaxed by 20% in the longitudinal direction (MD) and by 20% in the transverse direction (TD) at a heat treatment relaxation temperature of 90° C. to obtain a biaxial stretched film (deep drawing heat shrinkable multilayer film). The thickness of the obtained deep drawing heat shrinkable multilayer film was 90 μm.

Examples 2 to 8 and Comparative Examples 1 to 2

Biaxial stretched films (deep drawing heat shrinkable multilayer films) were obtained in the same way as that of Example 1 except that the film resin structure and manufacturing conditions were changed as described respectively in Table 2 (Examples 2 to 8 and Comparison 2). Additionally, as for Comparative Example 1, the resin structure was the same as that of Example 1, and an unstretched multilayer film was formed by a direct inflation method.

The thicknesses of the obtained deep drawing heat shrinkable multilayer films were 45 μm (Example 2), 90 μm (Example 3), 40 μm (Example 4), 90 μm (Example 5), 90 μm (Example 6), 40 μm (Example 7), 90 μm (Example 8), 90 μm (Comparative Example 1), and 90 μm (Comparative Example 2) respectively.

<Evaluation of Various Characteristics of Deep Drawing Heat Shrinkable Multilayer Films>

(I) Evaluation Method

The various characteristics of the deep drawing heat shrinkable multilayer films were evaluated or measured by the following method.

(1) Hot Water Shrinkability

A film sample was marked at a distance of 10 cm in a mechanical direction (longitudinal direction, MD) and in a direction (transverse direction, TD) perpendicular to the mechanical direction of the obtained deep drawing heat shrinkable multilayer film. The film sample was dipped in hot water adjusted to 90° C. for 10 seconds, and thereafter taken out and cooled with water of room temperature immediately. After that, the marked distance was measured, and a ratio of a value reduced from 10 cm to an original length of 10 cm was expressed in a percentage. Each sample was tested five times, and an average value in each of the longitudinal and transverse direction was expressed as a hot water shrinkability.

(2) Transparency (Haze Value)

A degree of cloudiness (haze; %) of the film sample was measured using a haze meter NDH-Σ80 made by Nippon Denshoku Industries Co., Ltd. as a measuring device according to the method described in JISK-7105. It should be noted that the haze value means that the smaller the value becomes, the more excellent in transparency, and vice versa.

(3) Film Tensile Strength

By use of TENSILON RTC-1210 (made by Orientec Co. LTD.) as a measuring device, a strip film sample having a width of 10 mm and a length of 50 mm was stretched at a crosshead rate of 200 mm/min at a temperature of 23° C. to measure stress (tensile strength) obtained when the film sample was broken.

(4) Gas Barrier Property (i) Oxygen Gas Transmission Rate ($O_2TR$)

An oxygen gas transmission rate was measured under conditions of a temperature of 23° C. and of 100% RH using Oxtran (OX-TRAN 2/20) made by Modern Controls Inc. according to the method described in JIS K-7126.

(ii) Water Vapor Transmission Rate (WVTR)

A water vapor transmission rate was measured under conditions of a temperature of 40° C. and of 90% RH by a cup method according to the method described in JIS Z-0208.

(5) Deep Drawability

A film sample was drawn with an area draw ratio of 3 times by means of the cylindrical type draw mold of 100 (p(drawing temperature: 90° C.) using a deep drawing packaging machine (FV603) made by Omori Co. Ltd. Then, the state of the film sample was visually observed and evaluated based on the following standard.

A: The film was normally drawn.

B: The film was drawn at a shallow depth relative to the mold.

C: The film was not able to be drawn or was broken.

(II) Evaluation Result

Regarding the respective deep drawing heat shrinkable multilayer films obtained in Examples 1 to 8 and Comparative Examples 1 to 2, the various characteristics of the deep drawing heat shrinkable multilayer films were evaluated or measured by the aforementioned method. Table 3 shows the obtained result.

drawing bottom film, and the deep drawing heat shrinkable multilayer films obtained in Example 7 was used as a deep drawing top film to thereby obtain a deep drawing film kit (Example 11). Meanwhile, the deep drawing heat shrinkable multilayer films obtained in Comparative Example 1 was used as a deep drawing bottom film and a deep drawing top film to thereby obtain a deep drawing film kit for comparison (Comparative Example 3).

(II) Evaluation Method and Evaluation Result

Using the deep drawing film kits (Examples 9 to 11 and Comparative Example 3), test samples were obtained by deep-drawing films by means of a molding machine (R250) made by Multivac Co. Ltd. (mold: 113×167×60 mm), by filling a block of ham with a weight of 400 g therein and packaging, and by shrinking the resultants in hot water at 90° C. for 10 seconds. As a result of observing the external appearances of the obtained test samples, it was recognized that the use of the deep drawing film kits of the present invention (Examples 9 to 11) made it possible to obtain packaged products having tight fitness to the contents due to heat shrinkage of the films and tension. Meanwhile, in the case of using the deep drawing film kit for comparison, many wrinkles occurred on the packaged product and the film had no tension, and a tight fitness to the content was insufficient.

As described above, according to the present invention, it is possible to provide a deep drawing heat shrinkable multilayer film having a high gas barrier property under high humidity, tight fitness to contents due to shrinkage and a good deep drawability and a manufacturing method for the deep drawing heat shrinkable multilayer film.

TABLE 3

|  | Haze value (%) | Hot water shrinkability MD/TD(%) | $O_2TR$ ($cm^3/m^2 \cdot day \cdot atm$) | WVTR ($g/m^2 \cdot day$) | Tensile strength MD/TD(MPa) | Deep drawability |
|---|---|---|---|---|---|---|
| Example 1 | 13 | 10/12 | 30 | 6 | 50/56 | A |
| Example 2 | 10 | 7/10 | 80 | 18 | 45/50 | A |
| Example 3 | 8 | 9/11 | 28 | 5 | 82/90 | A |
| Example 4 | 6 | 8/10 | 58 | 10 | 75/80 | A |
| Example 5 | 12 | 11/12 | 30 | 6 | 49/55 | A |
| Example 6 | 9 | 10/12 | 28 | 5 | 81/88 | A |
| Example 7 | 6 | 9/10 | 58 | 11 | 78/81 | A |
| Example 8 | 14 | 8/11 | 27 | 5 | 80/85 | A |
| Comparative example 1 | 17 | 1/2 | 31 | 6 | 35/40 | A |
| Comparative example 2 | 12 | 46/46 | 29 | 6 | 47/53 | C |

As being obvious from the result shown in Table 3, it was recognized that the deep drawing heat shrinkable multilayer film of the present invention was a deep drawing heat shrinkable multilayer film having a high gas barrier property under high humidity, a good deep drawability and tight fitness to contents due to shrinkage.

<Evaluation of Deep Drawing Film Kit>

(I) Evaluation Target

Examples 9 to 11 and Comparative Example 3

The deep drawing heat shrinkable multilayer films obtained in Examples 1 and 3 were used as deep drawing bottom films, and the deep drawing heat shrinkable multilayer films obtained in Examples 2 and 4 were used as deep drawing top films to thereby obtain deep drawing film kits in Examples 9 and 10. Moreover, the deep drawing heat shrinkable multilayer film obtained in Example 6 was used as a deep Accordingly, the deep drawing heat shrinkable multilayer film of the present invention is useful for deep drawing top and bottom materials. Therefore, the manufacturing method for the deep drawing heat shrinkable multilayer film of the present invention is useful as a technology of manufacturing deep drawing top and bottom materials.

What is claimed is:

1. A deep drawing heat shrinkable multilayer film comprising:

an intermediate layer made of a vinylidene chloride copolymer resin (a); and a resin layer made of a first thermoplastic resin (b) layered on at least one surface of the intermediate layer, wherein the deep drawing heat shrinkable multilayer film is subjected to:

a relaxation treatment, and a hot water shrinkage in each of longitudinal and transverse directions at a temperature of 90° C. of the deep drawing heat shrinkable multilayer film ranges from 3% to 12%.

2. The deep drawing heat shrinkable multilayer film according to claim 1, wherein the first thermoplastic resin (b) comprises at least one resin selected from the group consisting of a polyamide-based resin and a polyolefin-based resin.

3. The deep drawing heat shrinkable multilayer film according to claim 1, wherein an oxygen gas transmission rate is 100 cm$^3$/m$^2$·day·atm or less under conditions of a temperature of 23° C. and of 100% RH.

4. A method for manufacturing the deep drawing heat shrinkable multilayer film according to claim 1, comprising the steps of:
co-extruding at least two species of melted resins in a tubular shape to form a bubble of tubular film;
water-cooling the bubble of tubular film to below the lowest melting point of the resins, thereafter reheating the bubble of tubular film to a temperature of the highest melting point of the resins or above, and drawing the bubble of tubular film in a longitudinal direction while fluid is being supplied to the interior of the bubble of tubular film to stretch 2.5 to 4 times in longitudinal and transverse directions respectively to form a biaxial stretched film; and
folding the biaxial stretched film, thereafter performing heat treatment using steam or hot water of 60° C. to 95° C. from the outer surface side of the biaxial stretched film while fluid is being supplied to the interior of the biaxial stretched film, and performing relaxation treatment by 10% to 35% in longitudinal and transverse directions respectively at the same time with the heat treatment.

5. The deep drawing heat shrinkable multilayer film according to claim 1, comprising an adhesion layer comprising an adhesion resin (e) in between the layers (a) and (b).

6. A cross-linked deep drawing heat shrinkable multilayer film comprising a deep drawing heat shrinkable multilayer film according to claim 1 crosslinked by electron beam radiation.

7. The deep drawing heat shrinkable multilayer film according to claim 1, further comprising an inner layer made of a sealant resin (d) having a melting point lower than that of the first thermoplastic resin (b) by 5° C. or more.

8. The deep drawing heat shrinkable multilayer film according to claim 7, wherein the sealant resin (d) comprises at least one resin selected from the group consisting of a polyethylene homopolymer, a polyethylene copolymer, a polypropylene homopolymer, a polypropylene copolymer, an ethylene-based copolymer, and an ionomer.

9. The deep drawing heat shrinkable multilayer film according to claim 1, further comprising:
an outer layer comprising a second thermoplastic resin (c) which has a melting point higher than that of the first thermoplastic resin (b) by 10° C. or more, and wherein the resin layer made of the first thermoplastic resin (b) is not the outermost layer.

10. The deep drawing heat shrinkable multilayer film according to claim 9, wherein the second thermoplastic resin (c) comprises at least one resin selected from the group consisting of a polyester-based resin, a polyamide-based resin, and a polyolefin-based resin.

11. The deep drawing heat shrinkable multilayer film according to claim 9 comprising an inner layer made of a sealant resin (d), having a melting point lower than that of the first thermoplastic resin (b) by 5° C. or more.

12. The deep drawing heat shrinkable multilayer film according to claim 11, comprising an adhesion layer comprising an adhesion resin (e) in between at least two of the layers (a), (b), (c) and (d).

13. A deep drawing bottom film comprising the deep drawing heat shrinkable multilayer film according to claim 1, wherein a hot water shrinkage each of in longitudinal and transverse directions at a temperature of 90° C. of the deep drawing heat shrinkable multilayer film ranges from 3% to 12%.

14. A deep drawing film kit comprising the deep drawing bottom film according to claim 13.

15. A deep drawing packaged product comprising the deep drawing bottom film according to claim 13.

16. The deep drawing bottom film of claim 13 comprising a thickness from 60 to 150 μm.

17. A deep drawing top film comprising the deep drawing heat shrinkable multilayer film according to claim 1, wherein a hot water shrinkage in longitudinal and transverse directions at a temperature of 90° C. of the deep drawing heat shrinkable multilayer film ranges from 5% to 12%.

18. A deep drawing film kit comprising the deep drawing top film according to claim 17.

19. A deep drawing packaged product comprising the deep drawing top film according to claim 17.

20. The deep drawing top film of claim 17 comprising a thickness from 30 to 90 μm.

* * * * *